United States Patent [19]

Geron et al.

[11] Patent Number: 4,781,897

[45] Date of Patent: Nov. 1, 1988

[54] DISPENSERS

[76] Inventors: Stanley J. Geron, 75A Selwyn Ave.; Owen E. Hayward, 75 Selwyn Ave., both of Mission Bay Auckland, New Zealand

[21] Appl. No.: 923,096

[22] Filed: Oct. 24, 1986

[30] Foreign Application Priority Data

Nov. 29, 1985 [NZ] New Zealand ................... 214380

[51] Int. Cl.$^4$ ............................................. B01D 11/00
[52] U.S. Cl. ................................. 422/265; 210/169; 210/198.1; 210/242.1; 422/264; 137/268
[58] Field of Search ................. 422/264, 264 B, 265, 422/276–278; 137/268; 210/169, 198.1, 242.1, 756; 239/35, 60

[56] References Cited

U.S. PATENT DOCUMENTS

| | | | |
|---|---|---|---|
| 2,934,409 | 4/1960 | Biehl | 422/265 |
| 3,243,263 | 3/1966 | Schoenecker | 422/264 |
| 3,677,711 | 3/1970 | Bond | 422/265 |
| 4,217,331 | 8/1980 | Schaub | 422/265 |
| 4,473,533 | 9/1984 | Davey | 422/265 |
| 4,606,893 | 8/1986 | Sangster | 422/265 |
| 4,630,634 | 12/1986 | Sasaki et al. | 422/265 |
| 4,643,881 | 2/1987 | Alexander et al. | 422/265 |

*Primary Examiner*—Benoit Castel
*Attorney, Agent, or Firm*—Holman & Stern

[57] ABSTRACT

A dispenser is disclosed which releases a substance such as chlorine into an aqueous solution such as the water of a swimming pool. The dispenser includes a bag or sachet which has a liquid permeable wall. The chlorine or other soluble material within the bag or sachet is dissolved or subjected to a leaching action in the liquid. In this manner the material is released into the liquid. The dispenser contains both a buoyant material and weighting material. The overall weight of the dispenser is such that it is immersed when initially deposited into the liquid and is buoyant in the liquid when the reactive material has dissolved.

4 Claims, 1 Drawing Sheet

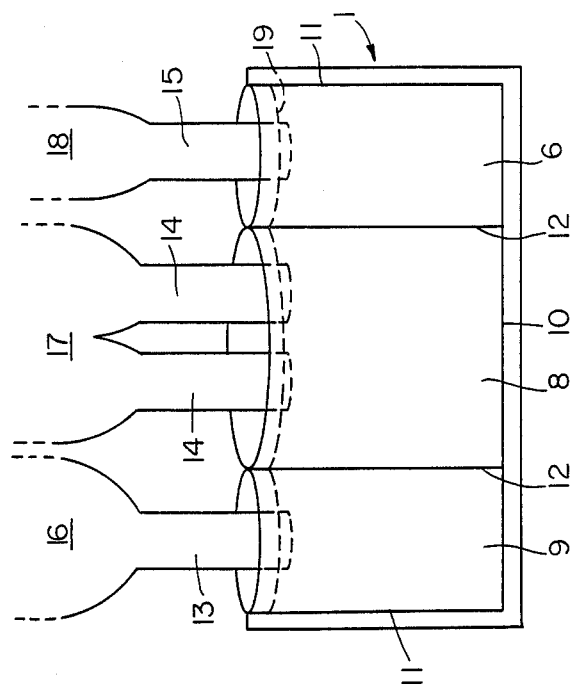
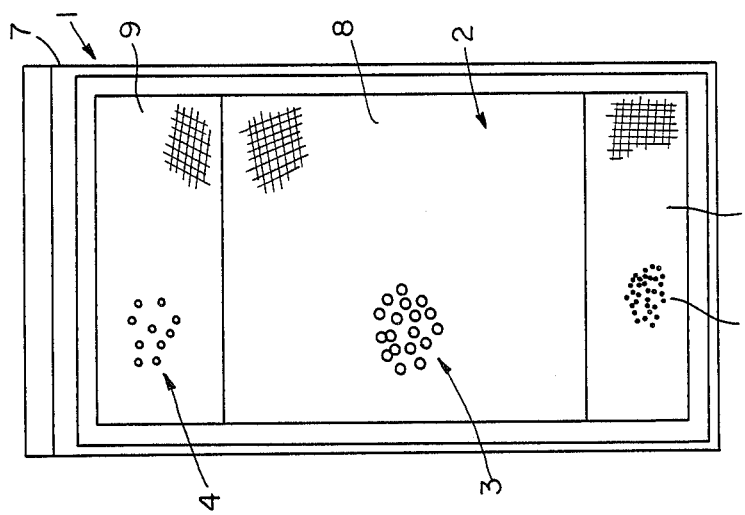

DISPENSERS

BACKGROUND OF THE INVENTION

This invention relates to a dispenser which has been devised particularly though not solely for use in dispensing chlorine into a swimming pool.

With devices such as swimming pools it is necessary to keep them clean in particular to keep them safe for use. As part of this it is frequently the case that the water in the swimming pool is treated with chlorine usually in the form of calcium hypochlorite granules which can be mixed with water to form a liquid which can then be poured into the swimming pool. Such a technique has some disadvantages. In particular the chlorine is positioned near the top of the pool and evaporation from the body of water can be at a high rate. Also in mixing the chlorine granules with water this is usually performed in an item such as bucket and there is a substantial risk of splashing or the like which can cause damage in particular to clothing from splashes of material coming therefrom. Some attempts to overcome this problem have been made by providing blocks of material that can be caused to float in a suitable floating device on the top of the body of water such as a swimming pool. Again this is disadvantageous as the chlorine is released to the top of the water and again the rate at which the chlorine evaporates from the water can be higher than is desirable.

SUMMARY OF THE INVENTION

It is therefore an object of the present invention to provide a dispenser which will obviate or minimise the foregoing disadvantages or which will at least provide the public with a useful choice.

Accordingly the invention consists in a dispenser comprising a bag or sachet having a wall, through which liquid may pass, material within said bag or sachet being able to dissolve or be subjected to a leaching action in a selected liquid so as to release a selected material into said selected liquid.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

One preferred form of the invention will now be described with reference to the accompanying drawings in which, FIG. 1 is a diagrammatic perspective view of one preferred form of a dispenser according to the invention, and FIG. 2 is a diagrammatic view of a method of filling dispensers according to the invention.

DESCRIPTION OF THE PREFERRED EMBODIMENTS

Referring to the drawings a dispenser is provided as follows.

The dispenser provides a bag or sachet 1 through which liquid may pass. The walls 2 of the bag or sachet 1 may be formed, for example, of the material from which tea bags are formed or from other material having apertures sufficiently small so that the material contained therein will not fall through the walls thereof. A spun bonded polyester is a suitable material, being cheap, able to be heat sealed and also resistant to deterioration when in contact with the material such as "chlorine" within the bag or sachet 1. However any "chlorine" resistant material may be used. Within the bag or sachet 1 is provided material which can dissolve to release a selected material into a selected liquid, in, particular water or from which the selected material will be leached. The selected material may be calcium hypochlorite which is commonly known as "chlorine" and dissolves to give algaecidal, bactericidal, deodorant, disinfectant and fungicidal action in bodies of liquid such as a swimming pool. Any other bleach which dissolves or leaches in water can be used. Preferably the material is in the form of granules 3 which dissolve in water to release "chlorine". Material of this type is known for releasing chlorine into swimming pools. Along with the chlorine releasing material is provided a buoyant material, for example, polystrene such as block or beads 4. The precise dimensions of the bag or sachet 1 is not of the essence of the invention but a 10×15 cm sachet could hold about 200 grams of the chlorine releasing material and if desired a smaller sachet or bag could be provided to hold say 100 grams of material. The relative quantities of the material that dissolves or leaches and the buoyant material is such that when the bag or sachet is initially dropped into the water it will fall below the surface of the water preferably to the bottom for example of a swimming pool but as the granules 3 dissolve the bag or sachet 1 will rise and will eventually float preferably as the chlorine release ends. Where the pool is formed for example of concrete it is desirable for the sachet to sink completely to the bottom and this can be ensured for example by adding weighting material such as sand 5 which may be contained in a container for example a separate sealed part 6 of the bag or sachet 1 or in a small plastic bag. The bag or sachet 1 itself may be contained in a plastic bag 7 also which may be reuseable as described later hereon. The bag 7 is desirably re-closeable. Where the dispenser is to be used in a swimming pool with a vinyl liner it is desirable that the bag is arranged not to fall completely to the bottom of the pool so as not to damage the liner. It is desirable that the bag also does not float on top of the water during the initial stages but rather releases the chlorine into a position in a pool or other body of water below the surface thereof and in fact is close to the bottom as possible.

To this end the sand in compartment 6 draws the bag or sachet 1 to the bottom of the pool but the presence of the beads 4 causes the "chlorine" compartment 8 and bead compartment 9 to rise above the pool floor with the compartment 6 resting on the pool floor.

The sachet or bag 1 can be made by heat sealing or otherwise forming on side weld 10, a pair of end welds 11 and two intermediate welds 12 to form the compartments 6, 8 and 9. These compartments can be filled in any desired manner such as by filling spouts 13, 14 and 15 respectively from hoppers 16, 17 and 18 holding floatation beads 4, "chlorine" granules 3, and sand 5 respectively. Any suitable measuring device can be used and techniques to achieve such measuring or metering are well known. Two spouts 14 are shown. Closing one spout 14 will result in about ½ of the amount of "chlorine" granules 3 being inserted into compartment 8. Once filling is completed the bag or sachet 1 is closed along line 19. The precise quantity of floatation material and sand to achieve the desired, initial sinking and later floatation can be determined by trial and error but about 50 gm of sand can be used for 200 gm of calcium hypochlorite and the quantity of floatation material will depend also on the material used. The best results are achieved when the buoyancy is such that the buoyant material will lift either the "chlorine" granules or weighting material alone but such that the weighting material plus even a relatively small quantity of "chlorine" granules will cause the dispenser to sink.

The use of the invention is as follows.

In use a bag or sachet 1 is placed into a body of water such as a swimming pool and allowed to remain therein until the chlorine release from the bag or sachet is completed. At this time the bag or sachet 1 will have floated to the surface of the body of water and can therefore be readily retrieved therefrom and returned desirably to the original plastic bag 7 for disposal. For 200 gms of calcium hypochlorite full dissolving of the "chlorine" will take about 2 hours.

Thus it can be seen that a dispenser is provided which will allow chlorine in particular to be released into a body of water such as a swimming pool in a simple yet effective manner. It is believed that the release of the chlorine into the lower parts of the body of water will reduce the rate at which the chlorine evaporates from the body of water and this also is advantageous. The dispenser removes the requirement to mix chlorine for example in a bucket and to pour it into a swimming pool which operation is substantially messy and can lead to bleaching for example of clothing from spills. Furthermore the residue is simply disposed of in a plastic bag which can be provided with the sachet or bag.

The claims defining the invention are as follows
We claim:

1. A dispenser for releasing a bleach into an aqueous solution, said dispenser comprising:
    a sachet, said sachet being formed from a sheet material and divided by a seam into at least a first compartment and a second compartment,
    (1) said first compartment having a liquid permeable wall and containing a water soluble bleach material,
    (2) said second compartment containing a weighting material, and
    (3) said sachet containing a bouyant material, wherein the overall weight of said dispenser is such that it is immersed when initially deposited in said aqueous solution and said dispenser is buoyant when said water soluble bleach material has been dissolved.

2. A dispenser as defined in claim 1 wherein the sachet includes a third compartment and the buoyant material is contained in the third compartment.

3. A dispenser as defined in claim 1 wherein the weighting material is sand.

4. A dispenser as defined in claim 1 wherein the water soluble bleach material is a granular chlorine release material which provides chlorine when dissolved

* * * * *